US012460793B2

(12) United States Patent
Kessler et al.

(10) Patent No.: US 12,460,793 B2
(45) Date of Patent: Nov. 4, 2025

(54) VARIABLE FROST SYSTEMS FOR A LIGHTING DEVICE AND LIGHTING DEVICES HAVE THE SAME

(71) Applicant: SIGNIFY HOLDING B.V., Eindhoven (NL)

(72) Inventors: Michelle Kessler, Dallas, TX (US); Paul Koenig, Dallas, TX (US)

(73) Assignee: SIGNIFY HOLDING B.V., Eindhoven (NL)

( * ) Notice: Subject to any disclaimer, the term of this patent is extended or adjusted under 35 U.S.C. 154(b) by 22 days.

(21) Appl. No.: 18/572,251

(22) PCT Filed: Jun. 8, 2022

(86) PCT No.: PCT/EP2022/065466
§ 371 (c)(1),
(2) Date: Dec. 20, 2023

(87) PCT Pub. No.: WO2022/268498
PCT Pub. Date: Dec. 29, 2022

(65) Prior Publication Data

US 2024/0295306 A1 Sep. 5, 2024

Related U.S. Application Data

(60) Provisional application No. 63/214,068, filed on Jun. 23, 2021.

(30) Foreign Application Priority Data

Jul. 5, 2021 (EP) .................................... 21183592

(51) Int. Cl.
*F21V 14/08* (2006.01)
*F21S 10/00* (2006.01)
(Continued)

(52) U.S. Cl.
CPC ............ *F21V 14/08* (2013.01); *F21S 10/007* (2013.01); *F21V 3/049* (2013.01); *F21W 2131/406* (2013.01)

(58) Field of Classification Search
CPC ......... F21S 10/00; F21S 10/007; F21V 14/08; F21V 14/085; F21W 2131/406
See application file for complete search history.

(56) References Cited

U.S. PATENT DOCUMENTS 5,988,835 A 11/1999 Allen
6,241,366 B1 * 6/2001 Roman ................ G02B 26/007 362/322

(Continued)

FOREIGN PATENT DOCUMENTS

CN 102297390 B 1/2013
EP 3671011 A1 6/2020

(Continued)

*Primary Examiner* — Abdulmajeed Aziz
*Assistant Examiner* — Steven Y Horikoshi

(57) ABSTRACT

A variable frost system (100) includes a first arm assembly (102) that includes a first arm structure (114), a first frost component (116), and a second frost component (118), where the first frost component (116) and the second frost component (118) are attached to the first arm structure (114). The variable frost system (100) includes further a second arm assembly (104) that includes a second arm structure (120), a third frost component (122), and a fourth frost component (124), where the third frost component (122) and the fourth frost component (124) are attached to the second arm structure (120). The first arm assembly (102) and the second arm assembly (104) are movable such that one or both of the first frost component (116) and the second frost component (118) and one or both of the third frost component (122) and the fourth frost component (124) are positioned to provide an overall frost lighting effect to a light beam (206).

20 Claims, 9 Drawing Sheets

(51) Int. Cl.

| | |
|---|---|
| ***F21V 3/04*** | (2018.01) |
| ***F21W 131/406*** | (2006.01) |

(56) References Cited

U.S. PATENT DOCUMENTS

| | | | | |
|---|---|---|---|---|
| 6,578,987 | B1 * | 6/2003 | Hough | F21V 5/008<br>359/740 |
| 2004/0017686 | A1 * | 1/2004 | Dedoro | F21V 29/00<br>362/373 |
| 2008/0247024 | A1 | 10/2008 | Jurik | |
| 2011/0103074 | A1 * | 5/2011 | Jurik | F21V 11/18<br>362/355 |
| 2015/0092422 | A1 * | 4/2015 | Jurik | F21V 9/04<br>362/296.09 |
| 2017/0090115 | A1 * | 3/2017 | Jurik | F21V 14/006 |
| 2020/0182435 | A1 * | 6/2020 | Jiang | A63J 5/025 |

FOREIGN PATENT DOCUMENTS

| | | | |
|---|---|---|---|
| WO | 2009081256 | A1 | 7/2009 |
| WO | 2009114632 | A1 | 9/2009 |
| WO | 2014031644 | A1 | 2/2014 |

* cited by examiner

VARIABLE FROST SYSTEMS FOR A LIGHTING DEVICE AND LIGHTING DEVICES HAVE THE SAME

CROSS-REFERENCE TO PRIOR APPLICATIONS

This application is the U.S. National Phase application under 35 U.S.C. § 371 of International Application No. PCT/EP2022/065466, filed on Jun. 8, 2022, which claims the benefit of European Patent Application No. 21183592.1, filed on Jul. 5, 2021, and U.S. Application Ser. No. 63/214,068, filed on Jun. 23, 2021. These applications are hereby incorporated by reference herein.

TECHNICAL FIELD

The present disclosure relates generally to lighting devices, and more particularly to a variable frost system and luminaires with a variable frost system.

BACKGROUND

Luminaires may be capable of providing different lighting effects. For example, a luminaire (e.g., an automated luminaire), may be capable of providing a frost lighting effect to soften the edges of a beam or projected image. Depending on the application, the level of frost might be very light such that the edges of the beam or image are slightly blurred. Alternatively, a desired level of frost may be very heavy such that the beam or image is significantly or completely obscured. In other cases, the desired frost lighting effect might be at some intermediate level. Because different levels of frost may be desired at different times and/or circumstances, the capability to smoothly change the level of frost to a desired frost level may be useful. Thus, a solution that provides the capability to smoothly vary the level of frost may be desirable.

SUMMARY

The present disclosure relates generally to lighting devices, and more particularly to a variable frost system and luminaires with a variable frost system. In an example embodiment, a variable frost system includes a first arm assembly that includes a first arm structure, a first frost component, and a second frost component, where the first frost component and the second frost component are attached to the first arm structure. The variable frost system includes further a second arm assembly that includes a second arm structure, a third frost component, and a fourth frost component, where the third frost component and the fourth frost component are attached to the second arm structure. The first arm assembly and the second arm assembly are movable such that one or both of the first frost component and the second frost component and one or both of the third frost component and the fourth frost component are positioned to provide an overall frost lighting effect to a light beam.

In another example embodiment, a lighting device includes a variable frost system and a light beam source configured to provide a light beam. The variable frost system includes a first arm assembly that includes a first arm structure, a first frost component, and a second frost component, where the first frost component and the second frost component are attached to the first arm structure. The variable frost system includes further a second arm assembly that includes a second arm structure, a third frost component, and a fourth frost component, where the third frost component and the fourth frost component are attached to the second arm structure. The first arm assembly and the second arm assembly are movable such that one or both of the first frost component and the second frost component and one or both of the third frost component and the fourth frost component are positioned to provide an overall frost lighting effect to a light beam.

These and other aspects, objects, features, and embodiments will be apparent from the following description and the appended claims.

BRIEF DESCRIPTION OF THE FIGURES

Reference will now be made to the accompanying drawings, where.

Figure 1:
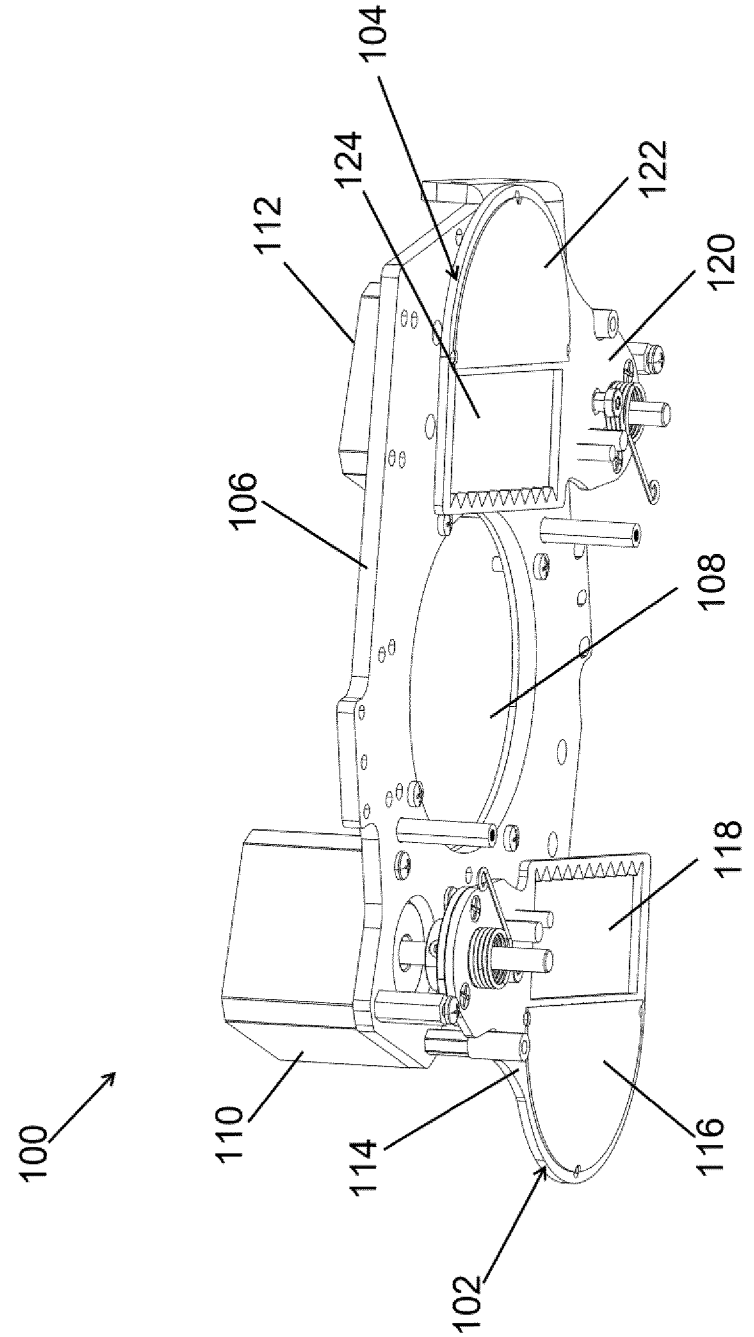
FIG. 1 illustrates a variable frost system according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals that are used in different drawings designate like or corresponding but not necessarily identical elements.

DETAILED DESCRIPTION OF EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

FIG. 1 illustrates a variable frost system 100 according to an example embodiment. In some example embodiments, the variable frost system 100 includes a first arm assembly 102 and a second arm assembly 104. The arm assembly 102 may include an arm structure 114 and frost components 116, 118. The frost components 116, 118 may be attached to the arm structure 114, for example, using glue and/or another means such as fasteners. As explained in more detail below, the frost component 116 may be on one side of the arm structure 114, and the frost component 118 may be positioned on an opposite side of the arm structure 114. The arm assembly 104 may include an arm structure 120 and frost components 122, 124. The frost components 122, 124 may be attached to the arm structure 120, for example, using glue and/or another means such as fasteners. As explained in more detail below, the frost component 122 may be positioned on one side of the arm structure 120, and the frost component 124 may be positioned on an opposite side of the arm structure 120.

In some example embodiments, the arm assembly 102 may be movable to move the frost components 116, 118 to different positions relative to an opening 108 in a plate 106. For example, the arm structure 114 may be attached to a shaft of a motor 110 and may be rotated along with the shaft of the motor 110. Because the frost components 116, 118 are attached to the arm structure 114, the rotation of the arm structure 114 may change the positions of the frost components 116, 118 relative to the opening 108. To illustrate, when the variable frost system 100 is integrated in a lighting device, a light beam (e.g., an illumination light or a projected image) may pass through the opening 108 from the area at a back side of the plate 106 to the area below the plate 106 in the orientation of the plate 106 shown in FIG. 1. The light beam that passes through the opening 108 may pass through one or both of the frost components 116, 118 depending on the positions of the frost components 116, 118, where one or both of the frost components 116, 118 provide a frost lighting effect to at least a portion of the light beam. As shown in FIG. 1, if the frost components 116, 118 are not aligned with the opening 108, the light beam may not be affected by the frost components 116, 118.

In some example embodiments, the arm assembly 104 may be movable to move the frost components 122, 124 to different positions relative to an opening 108 in a plate 106. For example, the arm structure 120 may be attached to a shaft of a motor 112 and may be rotated along with the shaft of the motor 112. Because the frost components 122, 124 are attached to the arm structure 120, the rotation of the arm structure 120 may change the positions of the frost components 122, 124 relative to the opening 108. To illustrate, a light beam that passes through the opening 108 may pass through one or both of the frost components 122, 124 depending on the positions of the frost components 122, 124, where one or both of the frost components 122, 124 provide a frost lighting effect to at least a portion of the light beam. If neither of the frost components 122, 124 is aligned with the opening 108 as shown in FIG. 1, the light beam may not be affected by the frost lighting effects of the frost components 122, 124.

In some example embodiments, the arm assembly 102 and the arm assembly 104 may be positioned across an opening 108 from each other. The motor 110 may be controlled to rotate the arm assembly 102 to change the positions of the frost components 116, 118 relative to the opening 108, and the motor 112 may be controlled to rotate the arm assembly 104 to change the positions of the frost components 122, 124 relative to the opening 108. The motors 110, 112 may be controlled such that the arm assembly 102 and the arm assembly 104 move simultaneously or separately. For example, the motors 110, 112 may be controlled such that the frost components 116, 118 and the frost components 122, 124 move simultaneously toward or away from the opening 108 below the plate 106 on opposite sides of the opening 108. In general, the arm assembly 102 and the arm assembly 104 may be rotated to positions that place the frost components 116, 118 and the frost components 122, 124 at desired positions relative to the opening 108 and with respect to each other.

In some example embodiments, the overall frost lighting effect provided by the variable frost system 100 depends on the positions of the frost components 116, 118 and the frost components 122, 124 relative to the opening 108. To illustrate, the frost components 116, 118 and the frost components 122, 124 may be positioned such that a light beam passing through the opening 108 passes through one or both of the frost components 116, 118 and through one or both of the frost components 122, 124. For example, the frost component 118 and the frost component 124 may be positioned adjacent and non-overlapping to each other such that a portion of the light beam passes through the frost component 118 and another portion of the light beam passes through the frost component 124. As another example, the frost component 118 and the frost component 124 may be positioned overlapping each other such that at least a portion of the light beam passes through both the frost component 118 and the frost component 124. To illustrate, the frost component 118 and the frost component 124 may provide a combined frost light effect to the light beam. As yet another example, the frost component 116 and the frost component 122 may be positioned adjacent and non-overlapping to each other such that a portion of the light beam passes through the frost component 116 and another portion of the light beam passes through the frost component 122. Alternatively, the frost component 116 and/or the frost component 122 may substantially or fully block portions of the light beam from passing therethrough.

In some example embodiments, the frost lighting effect of the frost component 116 may be more than the frost lighting effect of the frost component 118, and the frost lighting effect of the frost component 122 may be more than the frost lighting effect of the frost component 124. For example, the frost component 118 and the frost component 124 may each provide a light frost lighting effect ("light frost"), and the frost component 116 and the frost component 122 may each provide a heavy frost lighting effect ("heavy frost") as can be readily understood by those of ordinary skill in the art with the benefit of the scope of this disclosure. To illustrate, the frost component 118 and the frost component 124 may each include or may be made from Rosco Roscolux 132 Quarter Hamburg Frost Gel sheet, and the frost component 116 and the frost component 122 may each include or may be made from Brightview M-PR04-PE07-S-M diffusion sheet. When the frost component 118 and the frost component 124 are overlapped with each other such that a light beam passes through both, the combined frost lighting effect of the frost components 118, 124 on the light beam may be between the light frost lighting effect and the heavy frost lighting effect. In general, a light frost lighting effect may fall in a range of frost lighting effects that affect a light or a projected image less than a heavy frost lighting effect that falls in another range of frost lighting effects as can be readily understood by those of ordinary skill in the art with the benefit of the scope of this disclosure.

By moving the arm assemblies 102, 104, the overall frost lighting effect provided by the variable frost system 100 can be varied. By moving each of the arm assemblies 102, 104 to desired positions, the variable frost system 100 can provide a desired frost lighting effect for different circumstances and/or times. By controlling the movements of the arm assemblies 102, 104, the frost lighting effect provided by the variable frost system 100 can be smoothly changed. By moving the arm assemblies 102, 104 such that the frost components 116, 118, 122, 124 do not cover the opening 108 as shown in FIG. 1, no frost lighting effect may be applied by the variable frost system 100.

In some alternative embodiments, the arm assemblies 102, 104 may be at different positions with respect to the opening 108 than shown without departing from the scope of this disclosure. In some alternative embodiments, the arm assemblies 102, 104 may be at different locations with respect to the plate 106 than shown without departing from the scope of this disclosure. In some alternative embodiments, the frost components of each arm assembly 102, 104 may be positioned in a different configuration with respect to each other than shown without departing from the scope of this disclosure. In some alternative embodiments, one or more of the arm assemblies 102, 104 may include more or fewer frost components than shown without departing from the scope of this disclosure. In some alternative embodiments, the opening 108 may have a shape other than a circular shape without departing from the scope of this disclosure. In some alternative embodiments, the arm assemblies 102, 104 along with the frost components 116, 118, 122, 124 may have different shapes than shown without departing from the scope of this disclosure. In some alternative embodiments, the arm assemblies 102, 104 may each be attached to the respective motor 110, 112 in a different manner than shown without departing from the scope of this disclosure.

Figure 2:
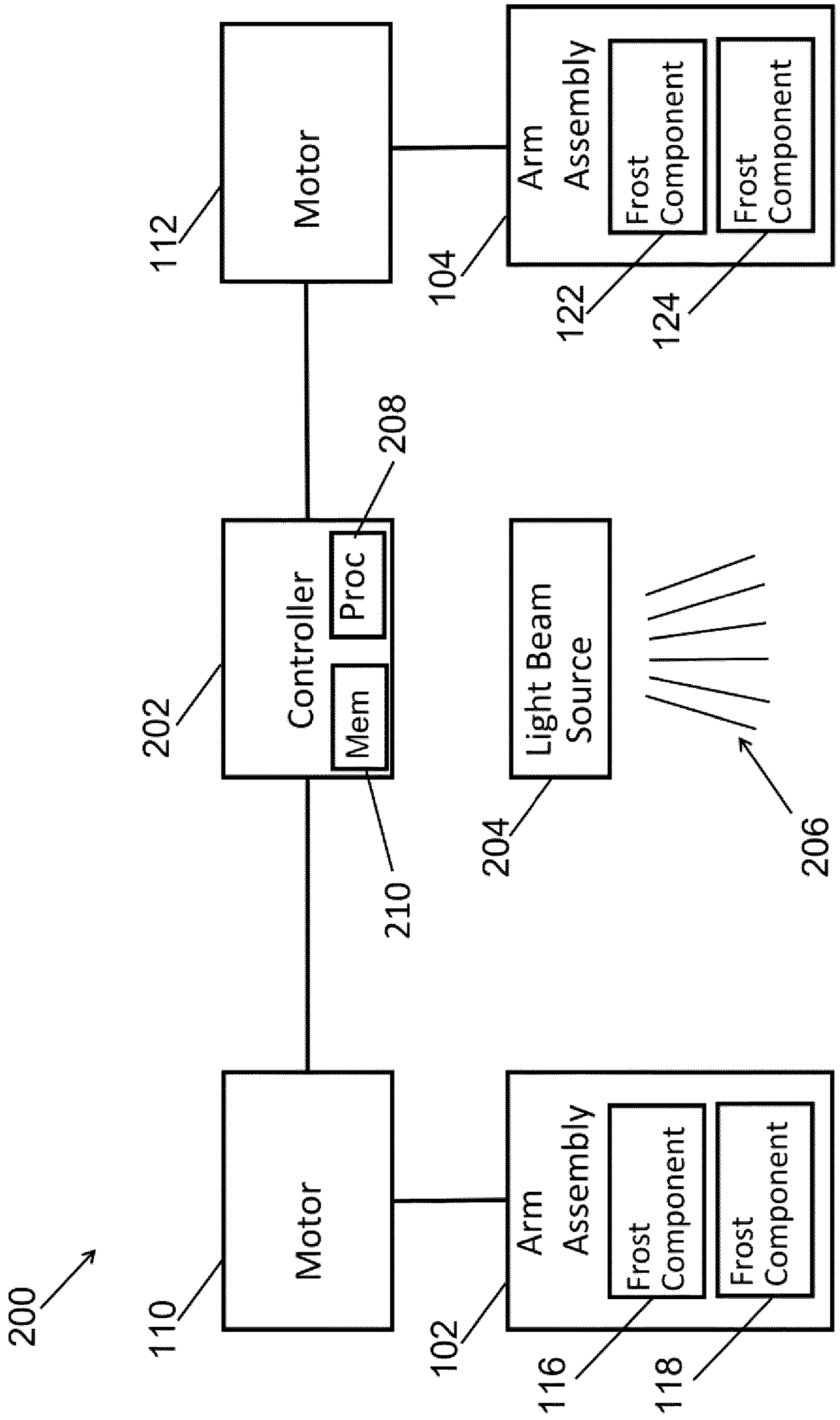
FIG. 2 illustrates a block diagram of a lighting device that includes the variable frost system of FIG. 1 according to an example embodiment.

FIG. 2 illustrates a block diagram of a lighting device 200 that includes the variable frost system 100 of FIG. 1 according to an example embodiment. Referring to FIGS. 1 and 2, in some example embodiments, the lighting device 200 may be a luminaire and/or a projector device as can be readily understood by those of ordinary skill in the art with the benefit of the scope of this disclosure. For example, the lighting device 200 may be an automated luminaire that is used for stage lighting.

In some example embodiments, the lighting device 200 includes the arm assemblies 102, 104 of the variable frost system 100, a controller 202, and a light beam source 204. The motor 110 may be directly (e.g., using the motor shaft) or indirectly (e.g., using belt and pulley) connected to the arm assembly 102, and the motor 112 may be directly or indirectly connected to the arm assembly 104. As shown in FIG. 1, the motors 110, 112 may be positioned on one side of the plate 106, and the arm assemblies 102, 104 may be on the opposite side of the plate 106.

In some example embodiments, the light beam source 204 may produce a light beam 206 that may be, for example, an illumination light or an image. For example, the light beam source 204 may include a light source and one or more image projection components as can be readily understood by those of ordinary skill in the art with the benefit of the scope of this disclosure. The light beam 206 may pass through the opening 108 of the plate 106 to reach, for example, an area or a surface below the lighting device 200. If some of the frost components 116, 118, 122, 124 of the variable frost system 100 are aligned with the opening 108 of the plate 106, the light beam 206 may also pass through the particular frost components. The controller 202 can change the overall frost lighting effect applied to the light beam 206 by changing the positions of the arm assemblies 102, 104, which changes the positions of the frost components 116, 118, 122, 124 with respect to the light beam 206 passing through the opening 108.

In some example embodiments, the controller 202 may include a controller/processor 208 and a memory device 210 (e.g., a static memory device). The controller 202 may control the motors 110, 112 that are used to change the positions of the arm assemblies 102, 104, for example, based on a user input. For example, the user input may indicate desired positions of the arm assemblies 102, 104 or a desired level of frost lighting effect. The controller/processor 208 of the controller 202 may execute software code stored in the memory device 210 to adjust the positions of the arm assemblies 102, 104 by controlling the rotations of motors 110, 112. The memory device 210 may also be used to store data as can be readily understood by those of ordinary skill in the art with the benefit of the scope of this disclosure.

In some alternative embodiments, the controller 202 may include multiple controllers and/or processors and/or memory devices without departing from the scope of this disclosure. In some alternative embodiments, different controllers may control the motors 110, 112 without departing from the scope of this disclosure.

Figure 3:
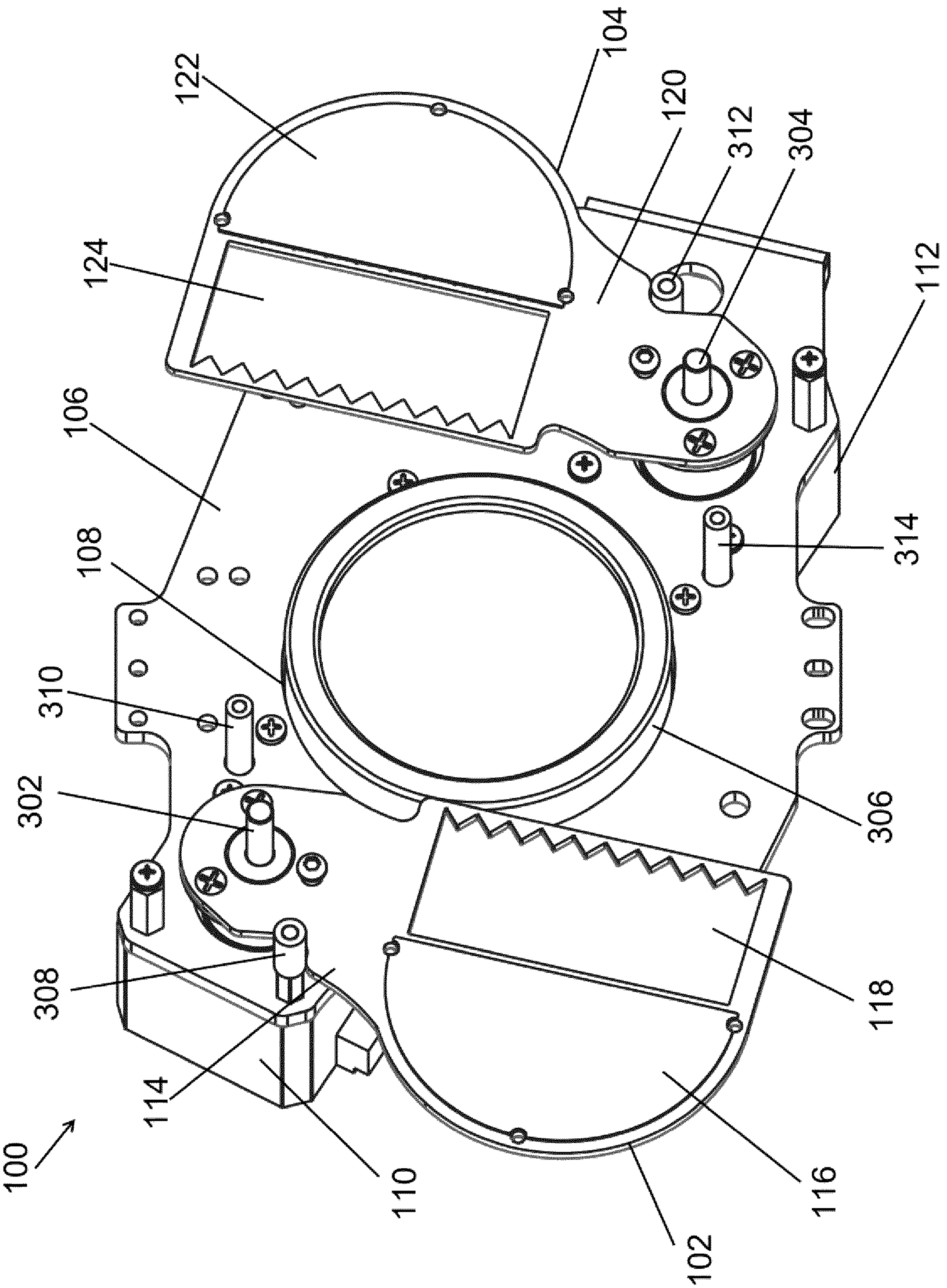
FIG. 3 illustrates another view of the variable frost system of FIG. 1 according to an example embodiment.

FIG. 3 illustrates another view of the variable frost system 100 of FIG. 1 according to an example embodiment. Referring to FIGS. 1-3, in some example embodiments, the motor 110 is positioned on one side of the plate 106, and the arm assembly 102 is positioned on an opposite side of the plate 106. A shaft 302 of the motor 110 extends through an opening in the plate 106 and is attached to the arm assembly 102. To illustrate, the shaft 302 may be attached to the arm structure 114 of the arm assembly 102 using an attachment structure. As described above, the positions of the frost components 116, 118 with respect to the opening 108 may be changed by changing the position of the arm assembly 102. Because the arm assembly 102 rotates along with the shaft 302, the rotation of the shaft 302 may change the position of the arm assembly 102.

In some example embodiments, the motor 112 is positioned on one side of the plate 106, and the arm assembly 104 is positioned on an opposite side of the plate 106. For example, the motors 110, 112 may be located on the same side of the plate 106, and the arm assemblies 102, 104 may be on the opposite side of the plate 106 as shown in FIG. 3. A shaft 304 of the motor 112 extends through an opening in the plate 106 and is attached to the arm assembly 104. To illustrate, the shaft 304 may be attached to the arm 120 of the arm assembly 102 using an attachment structure. As described above, the positions of the frost components 122, 124 with respect to the opening 108 may be changed by changing the position of the arm assembly 104. Because the arm assembly 104 rotates along with the shaft 304, the rotation of the shaft 304 may change the position of the arm assembly 104.

In some example embodiments, the rotational movement of the arm assembly 102 may be limited by stop structures 308 and 310 that may be attached to the plate 106, and the rotational movement of the arm assembly 104 may be limited by stop structures 312 and 314 that may be attached to the plate 106. For example, the clockwise rotation of the arm assembly 102 may be limited by the stop structure 308, and the counterclockwise rotation of the arm assembly 102 may be limited by the stop structure 310. The clockwise rotation of the arm assembly 104 may be limited by the stop structure 312, and the counterclockwise rotation of the arm assembly 104 may be limited by the stop structure 314.

Figure 8:
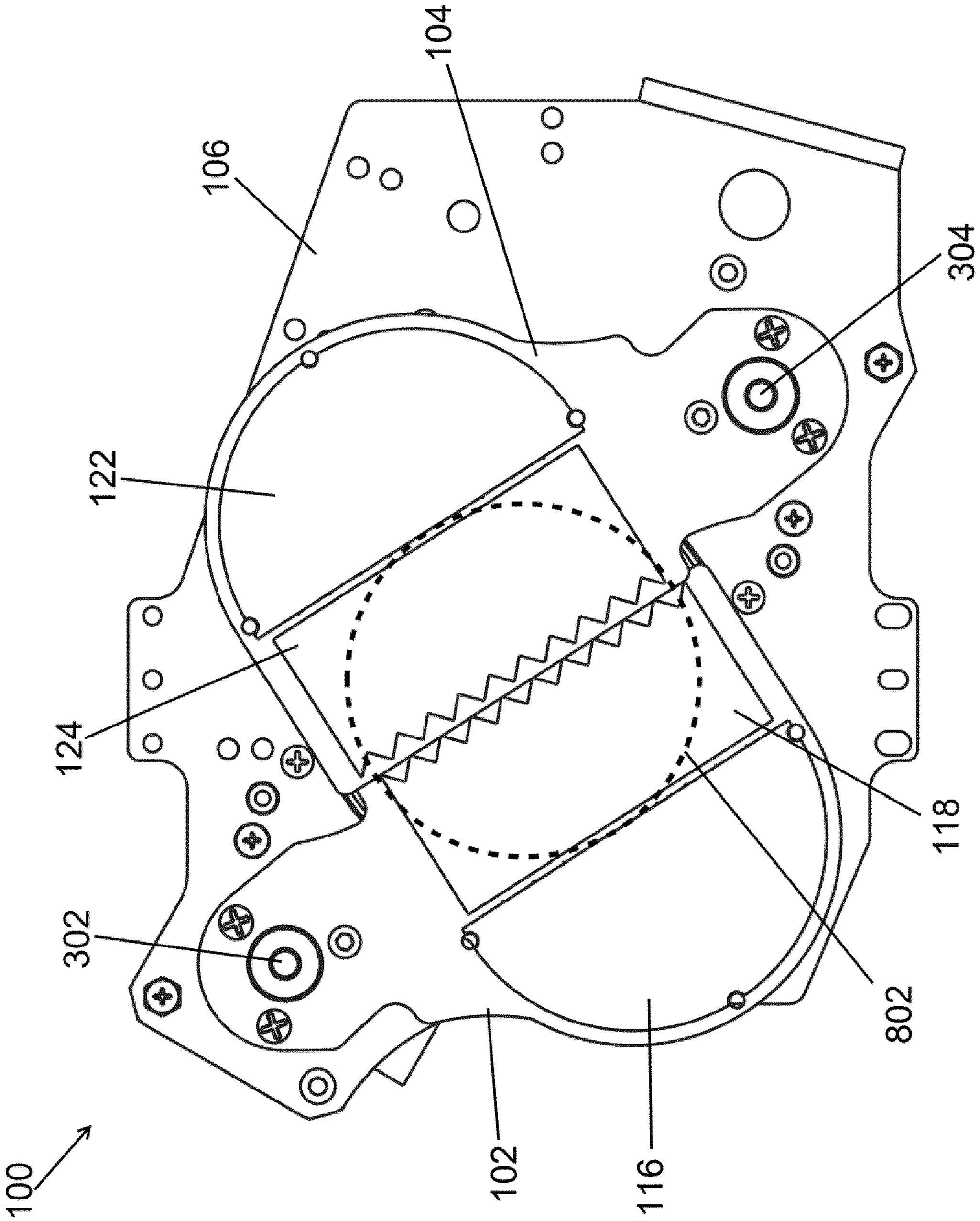
FIG. 8 illustrates the variable frost system of FIG. 1 adjusted to provide a frost lighting effect according to an example embodiment.
Figure 9:
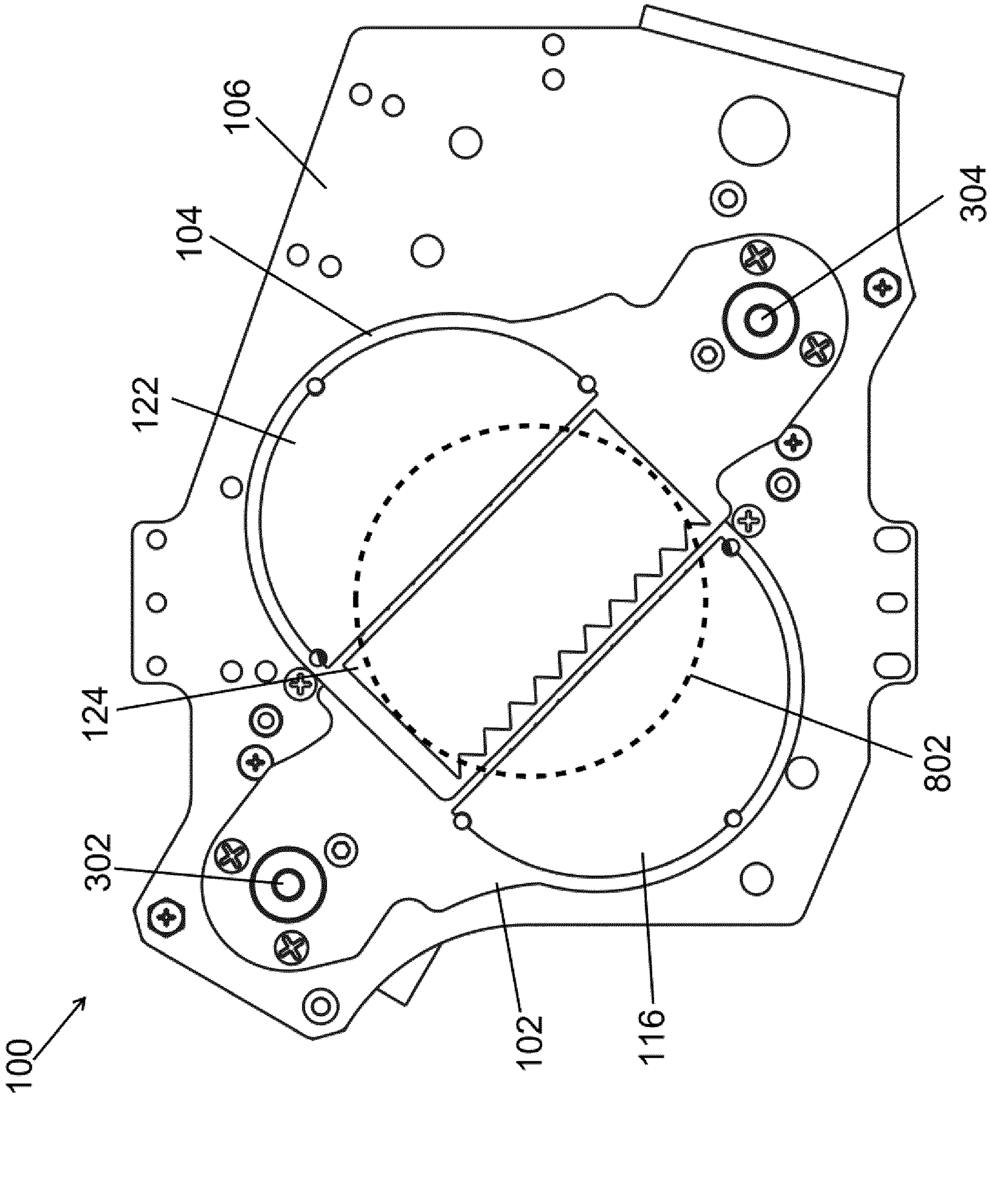
FIG. 9 illustrates the variable frost system of FIG. 1 adjusted to provide a different frost lighting effect from that provided by the variable frost system configured as shown in FIG. 8 according to an example embodiment.
Figure 10:
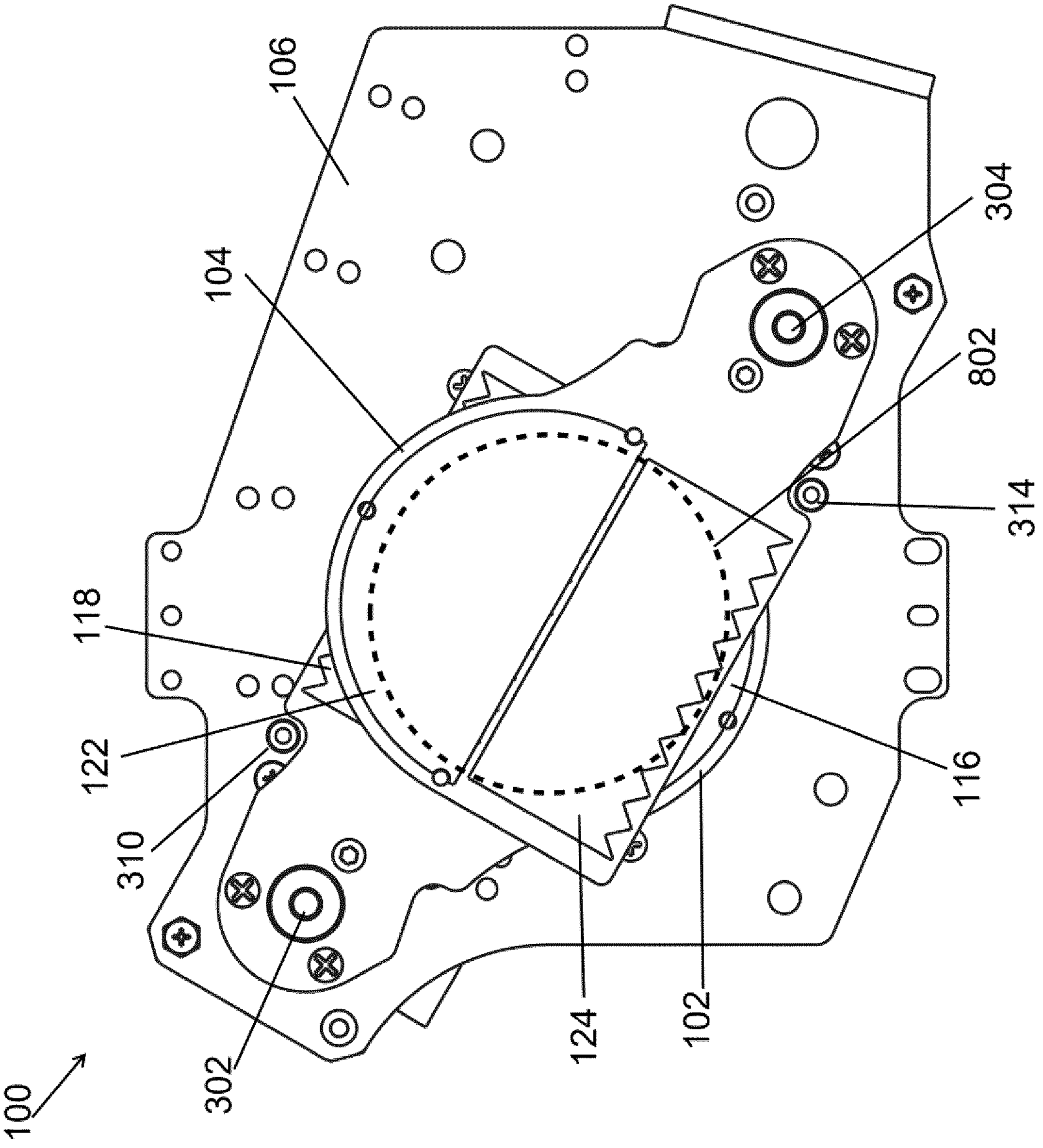
FIG. 10 illustrates the variable frost system of FIG. 1 adjusted to provide a different frost lighting effect from those provided by the variable frost system configured as shown in FIGS. 8 and 9 according to an example embodiment.

In some example embodiments, an optical component 306 (e.g., a lens) may be positioned at the opening 108 such that the light beam 206 (shown in FIG. 2) passes through the optical component 306. For example, the light beam 206 may pass through the optical component 306 before reaching one or more of the frost components 116, 118, 122, 124 that may be aligned with the opening 108 as shown in FIGS. 8-10. The optical component 306 may be integrated in or separate from the light beam source 204 (shown in FIG. 2).

In some example embodiments, the plate 106 may be made from plastic and/or metal using methods such as molding, milling, cutting, etc. as can be readily understood by those of ordinary skill in the art with the benefit of the scope of this disclosure. Fasteners, such as screws, may be used to attach different components of the variable frost system 100 as can be readily understood by those of ordinary skill in the art with the benefit of the scope of this disclosure. For example, the motors 110, 112 may be attached to the plate 106 using screws.

In some alternative embodiments, the motors 110 and 112 may be operationally coupled to the arm assemblies 102 and 104, respectively, in a different manner than shown without departing from the scope of this disclosure. For example, the motor 110 may be positioned away from the plate 106 and may be operationally coupled to the arm assembly 102 using one or more belts and pulleys or gears as can be readily understood by those of ordinary skill in the art with the benefit of the scope of this disclosure. The motor 112 may also be positioned away from the plate 106 and may be operationally coupled to the arm assembly 104 using one or more belts and pulleys or gears. In some alternative embodiments, the movements of the arm assemblies 102, 104 may be controlled in a different manner than shown without departing from the scope of this disclosure. For example, the arm assemblies 102, 104 may be controlled to move laterally instead of rotationally to different positions with respect to the opening 108 of the plate 106 or the optical component 306.

Figure 4B:
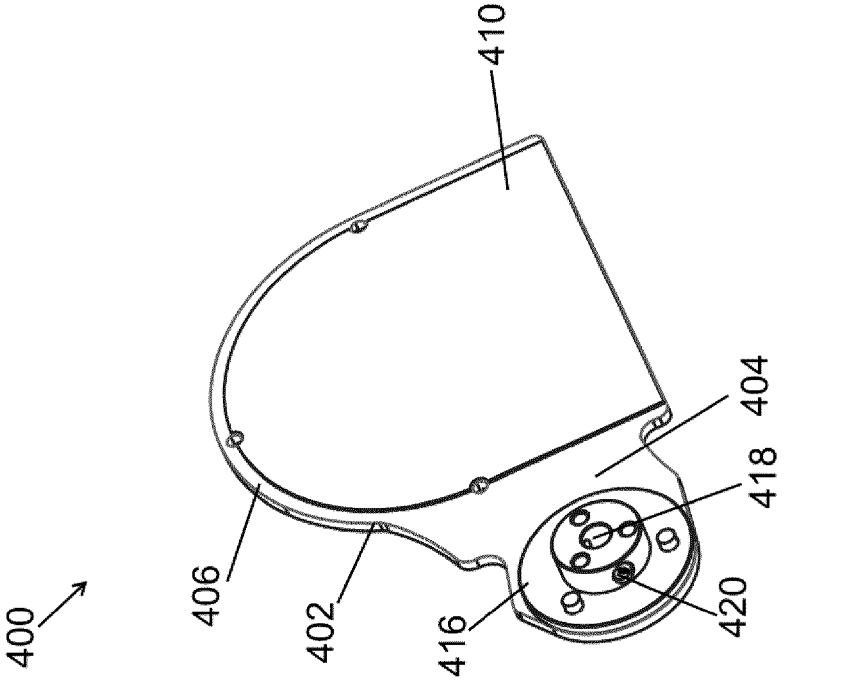
FIGS. 4A and 4B illustrate opposite sides of an arm assembly used in the variable frost system of FIG. 1 according to an example embodiment.
Figure 4A:
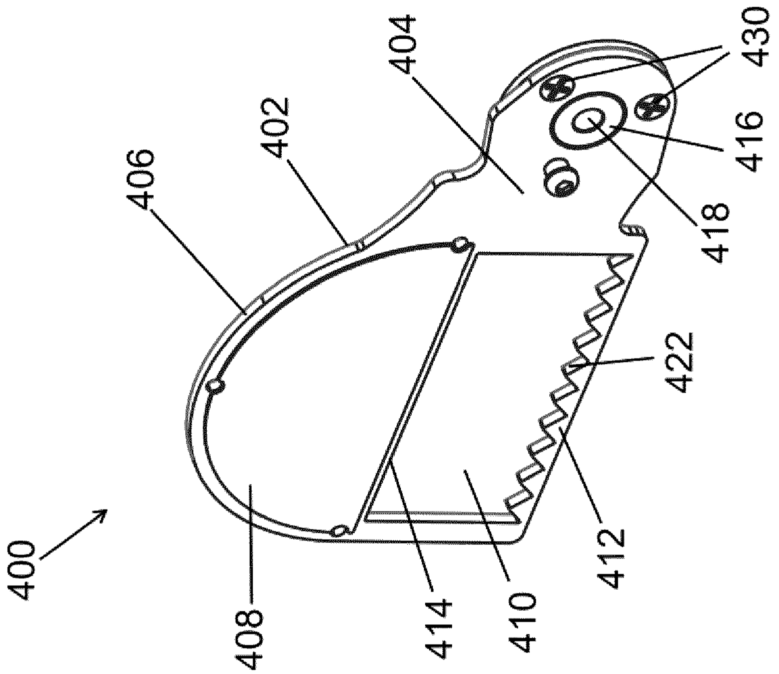
Figure 5:
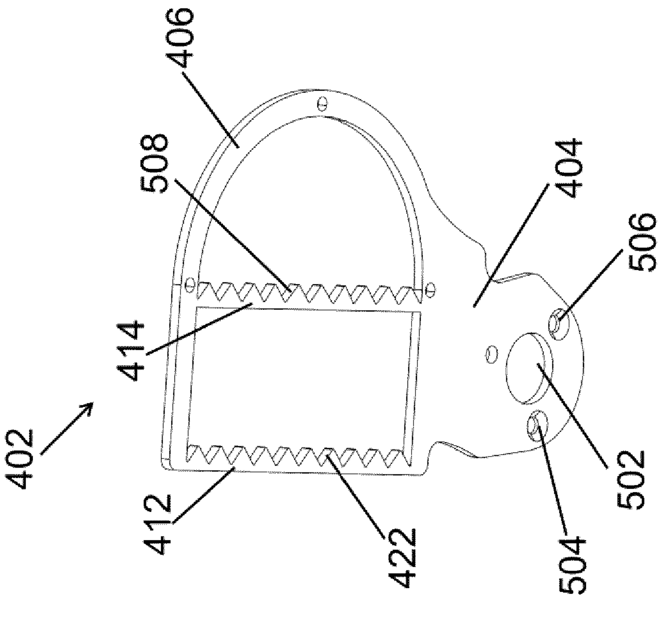
FIG. 5 illustrates an arm structure of the arm assembly of FIGS. 4A and 4B according to an example embodiment.

FIGS. 4A and 4B illustrate opposite sides of an arm assembly 400 used in the variable frost system 100 of FIG. 1 according to an example embodiment, and FIG. 5 illustrates the arm structure 402 of the arm assembly 400 of FIGS. 4A and 4B according to an example embodiment. Referring to FIGS. 4A-5, in some example embodiments, the arm assembly 400 may correspond to each arm assembly 102, 104. The arm assembly 400 includes an arm structure 402 that includes an attachment section 404 and a frame section 406. A frost component 408 may be attached to the frame section 406 on one side of the arm structure 402, and a frost component 410 may be attached to the frame section 406 on an opposite side of the arm structure 402. The frost components 408, 410 may be glued to the frame section 406. Alternatively or in addition, one or more fasteners may be used to securely attach the frost components 408, 410 to the frame section 406. As can be seen in FIGS. 4A and 4B, the frost component 408 may overlap with a portion of the frost component 410. The overlapping portions of the frost components 408, 410 may be spaced from each other, for example, by the thickness of the frame section 406. Alternatively, the frost components 408, 410 may not have overlapping portions without departing from the scope of this disclosure.

In some example embodiments, the frame section 406 may have a U-shaped outline along with crossbars 412, 414 that extend across the frame section 406 as more clearly shown in FIG. 5. The crossbar 412 may include a sawtooth edge 422 and may overlap an edge portion of the frost component 410 as more clearly shown in FIGS. 4A and 4B. The crossbar 414 may include a sawtooth edge 508 and may overlap an edge portion of the frost component 408. In some cases, the effects of the sawtooth edges 422, 508 on a light beam that passes through the frost components 408, 410 may be more desirable than the effects of the edges of the frost components 408, 410 on the light beam (e.g., the light beam 206 shown in FIG. 2).

In some example embodiments, an attachment structure 416 may be used to attach the arm assembly 402 to a motor such as the motor 110 or the motor 112 shown in FIG. 1. To illustrate, the attachment structure 416 may be attached to the attachment section 404 of the arm structure 402 using fasteners 430 that may extend through holes 504, 506 in the attachment section 404. An opening 418 in the attachment structure 416 may be aligned with an opening 502 in the attachment section 404, and the shaft of a motor (e.g., the shaft 302 of the motor 110 or the shaft 304 of the motor 112) may extend through the opening 418. A shaft extending through the opening 418 may be securely attached to the attachment structure 416, and thus to the arm structure 402, by a screw 420 (e.g., a set screw) that extends through a hole in the attachment structure 416 and reaches the shaft. The screw 420 may be used to securely attach the arm structure 402 to the shaft of a motor at a desired location of the shaft.

In some example embodiments, the arm structure 402 corresponds to each arm structure 114, 120. In some example embodiments, the frost component 408 corresponds to each frost component 116, 122, and the frost component 410 corresponds to each frost component 118, 124. The frost component 408 may have more frost lighting effect on a light beam than the frost component 410. Alternatively, the frost component 408 may have less frost lighting effect on a light beam than the frost component 410. As more clearly shown in FIGS. 4A and 4B, the frost component 408 may have a generally semicircular shape, and the frost component 410 may have a U-shaped outer perimeter. In general, the frost components 408, 410 may each have an outer perimeter shape that closely matches the shape of at least a portion of the frame section 406.

In some example embodiments, the arm structure 402 and the attachment structure 416 may be made from plastic or another suitable material using methods such as molding, milling, cutting, etc. The frost components 408, 410 may be made from or may include a frost gel material that may be available, for example, from suppliers such as Rosco Laboratories, Brightview Technologies, Lee Filters, Apollo Optical Systems, and others. The frost components 408, 410 may be made from one or more other materials such as a frost glass panel.

In some alternative embodiments, the frost components 408, 410 may be reversed such that the frost component 408 is positioned on the side of the arm structure 402 where the frost component 410 is located as shown in FIGS. 4A and 4B. In some alternative embodiments, the arm structure 402 may have a different shape than shown without departing from the scope of this disclosure. For example, the frame section 406 may have an outline that is not U-shaped. In some alternative embodiments, a different attachment mechanism than the attachment structure 416 may be used without departing from the scope of this disclosure.

Figure 6:
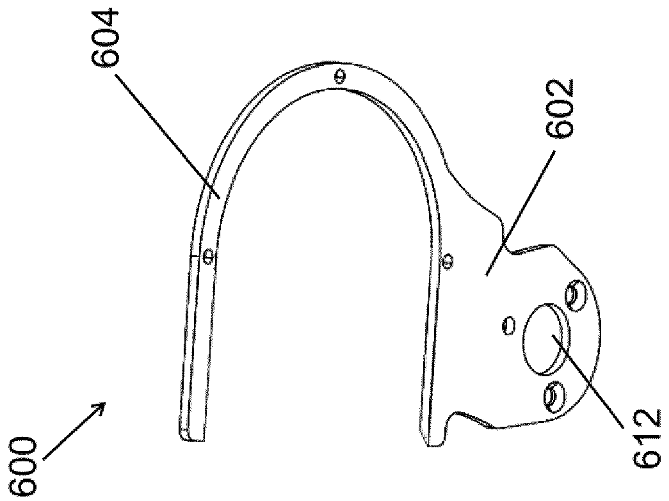
FIG. 6 illustrates an arm structure according to another example embodiment.
Figure 7B:
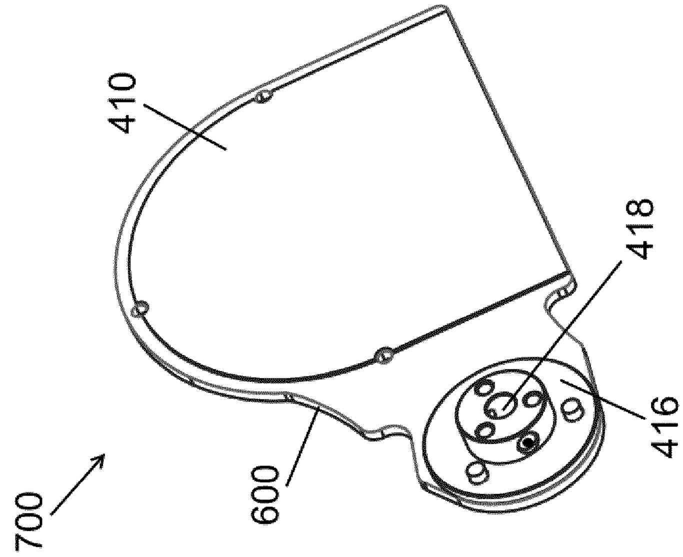
FIGS. 7A and 7B illustrate an arm assembly including the arm structure of FIG. 6 according to an example embodiment.
Figure 7A:
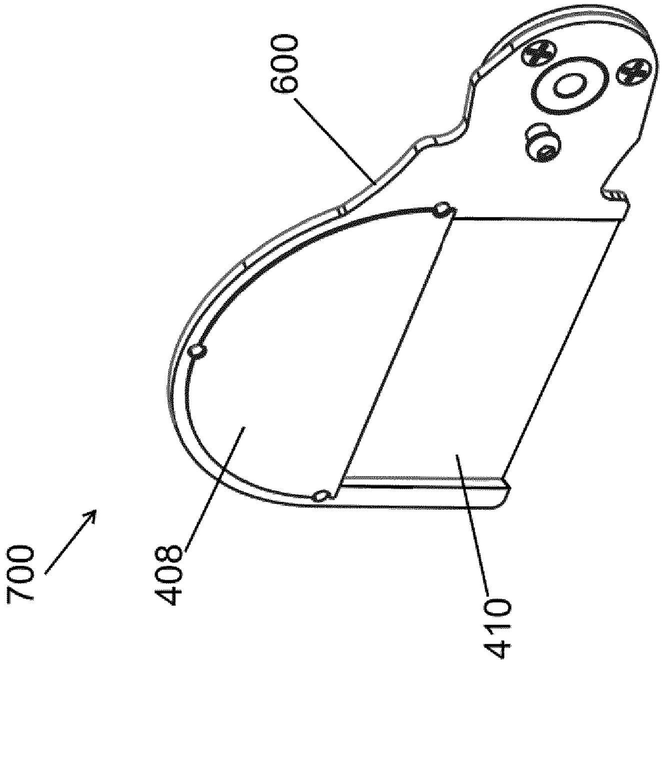

FIG. 6 illustrates an arm structure 600 according to another example embodiment, and FIGS. 7A and 7B illustrate an arm assembly 700 including the arm structure 600 of FIG. 6 according to an example embodiment. In some example embodiments, the arm assembly 700 may be used in the variable frost system 100 of FIG. 1 without departing from the scope of this disclosure.

Referring to FIGS. 6-7B, in some example embodiments, the arm assembly 700 includes an arm structure 600 and the frost components 408, 410 that are attached to the arm structure 600. In general, the arm assembly 700 is similar to the arm assembly 400 shown in FIGS. 4A and 4B. For example, the frost components 408, 410 are attached to the arm structure 600 in a similar manner. The arm assembly 700 may be made with the same type of material and in a similar manner as described with respect to the arm assembly 400. In contrast to the arm structure 402 of the arm assembly 400, the crossbars 412, 414 of the arm structure 402 are omitted from the arm structure 600.

In some example embodiments, the arm structure 600 includes an attachment section 602 and a frame section 604. The attachment section 602 may include a hole 612. For example, the attachment structure 416 may be positioned at and aligned with the hole 612 as shown in FIGS. 7A and 7B. To illustrate, a shaft of a motor (e.g., the shaft 302 or the shaft 304 shown in FIG. 3) may extend through the hole 418 in a similar manner as described with respect to the arm assembly 400 (shown in FIGS. 4A and 4B). A screw (e.g., the screw 420 shown in FIGS. 4A and 4B) may securely attach the arm structure 600 to the shaft extending through the hole 418.

In some alternative embodiments, the arm assembly 700 may have a different shape than shown without departing from the scope of this disclosure. In some alternative embodiments, the arm structure 600 may include one of the crossbars 412, 414 without departing from the scope of this disclosure. In some alternative embodiments, an attachment structure other than the attachment structure 416 may be used to attach the arm assembly 700 to a motor.

FIG. 8 illustrates the variable frost system 100 of FIG. 1 adjusted to provide a frost lighting effect according to an example embodiment. Referring to FIGS. 1-3 and 8, in some example embodiments, the arm assemblies 102, 104, each attached to the respective shaft 302 or 304, may be rotated to the positions shown in FIG. 8. To illustrate, the arm assemblies 102, 104 are rotated such that the frost components 118, 124 are positioned generally adjacent and non-overlapping to each other and in the path of a light beam passing through the optical component 306. As described with respect to FIG. 3, the optical component 306 is positioned at and through the opening 108 of the plate 106. In FIG. 8, a dotted line 802 represents an inner perimeter outline of the optical component 306.

In some example embodiments, the arm assemblies 102, 104 may be rotated to the positions shown in FIG. 8 starting from the positions shown in FIG. 3 or from other positions. The arm assemblies 102, 104 may also be rotated to the positions shown in FIG. 8 simultaneously. As shown on FIG. 8, the frost components 118, 124 are positioned such that a portion of a light beam (e.g., the light beam 206 shown in FIG. 8) passes through the frost component 118 and another portion of the light beam passes through the frost component 124.

In some example embodiments, each of the frost components 118, 124 may provide a light frost lighting effect, where the overall frost lighting effect applied to the light beam by the variable frost system 100 may be a light frost lighting effect. For example, both of the frost components 118, 124 may provide generally the same level of frost lighting effect. Alternatively, the frost components 118, 124 may provide different frost lighting effects from each other. For example, the frost components 118, 124 may provide light frost lighting effects that are different from each other.

As shown in FIG. 8, the frost components 116, 122 may not contribute to the overall frost lighting effect provided by the variable frost system 100. To illustrate, the frost components 116, 122 may be positioned generally out of the path of a light beam passing through the optical component 306.

In some alternative embodiments, the arm assemblies 102, 104 may be rotated to different positions than shown in FIG. 8 without departing from the scope of this disclosure. In some alternative embodiments, the optical component 306 shown in FIG. 3 may be omitted, and the dotted line 802 may instead represent a perimeter of the opening 108 in the plate 106 without departing from the scope of this disclosure.

FIG. 9 illustrates the variable frost system 100 of FIG. 1 adjusted to provide a different frost lighting effect from that provided by the variable frost system 100 configured as shown in FIG. 8 according to an example embodiment. Referring to FIGS. 1-3 and 9, in some example embodiments, the arm assemblies 102, 104, each attached to the respective shaft 302 or 304, may be rotated to the positions shown in FIG. 9. The arm assemblies 102, 104 may be rotated such that the frost components 118, 124 are positioned generally overlapping each other. For example, the arm assemblies 102, 104 may be attached to the respective shaft 302 or 304 to allow the frost components 118, 124 to move past each other to the overlapping positions shown in FIG. 9. As described with respect to FIG. 3, the optical component 306 may be positioned at the opening 108 of the plate 106, where the inner perimeter outline of the optical component 306 is represented by the dotted line 802 shown in FIGS. 8 and 9. In FIG. 9, the frost components 118, 124 are overlapping each other such that portion of a light beam from the optical component 306 passes through both frost components 118, 124. In FIG. 9, the frost component 118 is hidden from view by the frost component 124. The components 116, 122 may also be partially aligned with the optical component 306 such that a respective portion of the light beam can pass through the respective component 116, 122.

In some example embodiments, each of the frost components 118, 124 may provide a light frost lighting effect, and each frost component 118, 124 may provide a heavy frost lighting effect. The combined frost lighting effect applied to the portion of the light beam by the frost component 118, 124 is more than the light frost lighting effect of the individual frost component 118, 124. The overall frost lighting effect applied to the light beam by the variable frost system 100 may be the combination of the frost lighting effects of the frost components 118, 124 applied to a portion of the light beam and the frost lighting effect of the frost components 116, 122 applied to other respective portions of the light beam.

In some example embodiments, the arm assemblies 102, 104 may each be rotated to the positions shown in FIG. 9 starting from the positions shown in FIG. 3, in FIG. 8, or from other positions. The arm assemblies 102, 104 may also be rotated to the positions shown in FIG. 9 simultaneously, for example, starting from the positions shown in FIG. 8.

In some alternative embodiments, the arm assemblies 102, 104 may be rotated to different positions than shown in FIG. 9 without departing from the scope of this disclosure. For example, the arm assemblies 102, 104 may be rotated to respective positions that are between those shown in FIGS. 8 and 9. In some alternative embodiments, the optical component 306 shown in FIG. 3 may be omitted, and the dotted line 802 may instead represent a perimeter of the opening 108 in the plate 106 without departing from the scope of this disclosure.

FIG. 10 illustrates the variable frost system 100 of FIG. 1 adjusted to provide a different frost lighting effect from those provided by the variable frost system 100 configured as shown in FIGS. 8 and 9 according to an example embodiment. Referring to FIGS. 1-3 and 10, in some example embodiments, the arm assemblies 102, 104, each attached to the respective shaft 302 or 304, may be rotated to the positions shown in FIG. 10. The arm assemblies 102, 104 may be rotated such that the frost components 116, 122 are positioned generally adjacent and non-overlapping to each other, where the frost component 116 overlaps the frost component 124, and the frost component 122 overlaps the frost component 118. As described with respect to FIG. 3, the optical component 306 may be positioned at the opening 108 of the plate 106, where the inner perimeter outline of the optical component 306 is represented by the dotted line 802 shown in FIGS. 8-10. A portion of a light beam from the optical component 306 passes through both frost components 116, 124, and another portion of the light beam passes through both frost components 122, 118. In addition, because a portion of the frost component 118 overlaps the frost component 116, the portion of the light beam that passes through the frost components 116, 124 also passes through the frost component 118. Also, because a portion of the frost component 124 overlaps the frost component 122, the portion of the light beam that passes through the frost components 122, 118 also passes through the frost component 124.

In some example embodiments, each of the frost components 118, 124 may provide a light frost lighting effect, and each frost component 116, 122 may provide a heavy frost lighting effect. For example, the overall frost lighting effect provided by the variable frost system 100 may be the heavy frost lighting effect because of the dominance of the heavy frost lighting effect over the light frost lighting effect of the frost components 116, 122.

In some example embodiments, the arm assemblies 102, 104 may each be rotated to the positions shown in FIG. 10 starting from the positions shown in FIG. 3, in FIG. 8, in FIG. 9, or from other positions. The arm assemblies 102, 104 may also be rotated to the positions shown in FIG. 10 simultaneously, for example, starting from the positions shown in FIG. 9.

In some alternative embodiments, the arm assemblies 102, 104 may be rotated to different positions than shown in FIG. 10 without departing from the scope of this disclosure, which can result in the variable frost system 100 providing a different overall frost lighting effect. For example, the arm assemblies 102, 104 may be rotated to respective positions that are between those shown in FIGS. 9 and 10. In some alternative embodiments, the optical component 306 shown in FIG. 3 may be omitted, and the dotted line 802 may instead represent a perimeter of the opening 108 in the plate 106 without departing from the scope of this disclosure.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the scope of the following claims, the scope of which are to be accorded the broadest interpretation so as to encompass modifications and equivalent structures.

The invention claimed is:

1. A variable frost system, comprising:

a first frost component and third frost component, wherein the first frost component and third frost component are attached to a first arm structure, wherein the first and third frost components are adjacent each other; and a second frost component and fourth frost component, wherein the second frost component and fourth frost component are attached to a second arm structure, wherein the second and fourth frost components are adjacent each other;

wherein the first arm structure and the second arm structure are located on opposing sides of an aperture for a light beam and both are movable such that, in a first position of the variable frost system, the first frost component and the second frost component are at least partially overlapped with each other such that the first frost component and the second frost component are positioned to provide a combined frost lighting effect to at least a portion of the light beam; and wherein, in a second position of the variable frost system, the first frost component and the fourth frost component are at least partially overlapped with each other and the second and third frost components are at least partially overlapped with each other.

2. The variable frost system of claim 1, wherein the first frost component and the second frost component are at least partially non-overlapping with each other and are each positioned to provide a respective frost lighting effect to at least a respective portion of the light beam.

3. The variable frost system of claim 1, wherein, in the first position of the variable frost system, at least a different portion of the light beam does not pass through the first frost component.

4. The variable frost system of claim 1, wherein the combined frost lighting effect includes a frost lighting effect of the first frost component and a frost lighting effect of the second frost component, wherein the frost lighting effect of the first frost component is substantially similar to the frost lighting effect of the second frost component.

5. The variable frost system of claim 1, wherein the first arm structure and the second arm structure are each movable by a motor.

6. The variable frost system of claim 1, wherein the first frost component and the second frost component each comprises a translucent frost gel sheet or a frosted glass panel.

7. The variable frost system of claim 1, wherein an overall frost lighting effect is adjustable by changing positions of the first arm structure or the second arm structure.

8. The variable frost system of claim 7, wherein the first arm structure and the second arm structure are rotatable.

9. The variable frost system of claim 1, wherein the first arm structure and the second arm structure are simultaneously movable to change positions of at least the first frost component and the second frost component with respect to the light beam.

10. The variable frost system of claim 1, wherein the first arm structure comprises a first crossbar and a second crossbar, the first crossbar having a first sawtooth edge and the second crossbar having a second sawtooth edge.

11. A lighting device with a variable frost system, comprising:

at least one light source emitting a light beam;

a first frost component, wherein at least the frost component is attached to a first arm structure, wherein the first arm structure comprises a first crossbar and a second crossbar, the first crossbar having a first sawtooth edge and the second crossbar having a second sawtooth edge; and second frost component, wherein at least the second frost component is attached to a second arm structure, wherein at least the first arm structure and the second arm structure are each rotatable by a motor, wherein, in a position of the variable frost system, the first arm structure and the second arm structure are rotatable to a position such that first frost component and the second frost component are at least partially overlapped with each other such that the first frost component and the second frost component are positioned to provide a combined frost lighting effect to at least a portion of the light beam of the lighting device.

12. The lighting device of claim 11, wherein the first arm structure and the second arm structure are movable to a position such that the first frost component provides a lighting effect to a first portion of the light beam and the second frost component provides a lighting effect to a second portion of the light beam.

13. The variable frost system of claim 11, wherein the first arm structure and the second arm structure are rotatable in the same direction.

14. A lighting device with a variable frost system, comprising:

at least one light source emitting a light beam;

a first frost component and a third frost component, wherein the first and third frost components are associated with a first motor, wherein the first and third frost components are movable by the first motor, wherein the first and third frost components are adjacent each other and have different frost lighting effects, wherein a lighting effect of the first frost component is a lighter frost lighting effect compared to a frost lighting effect of the third frost component;

a second frost component and a fourth frost component, wherein the second and fourth frost components are associated with a second motor, wherein the second and fourth frost components are movable by the second motor, wherein the second and fourth frost components are adjacent each other;

wherein, in a first position of the variable frost system, the first frost component and the second frost component are at least partially overlapped with each other such that the first frost component and the second frost component are positioned to provide a combined frost lighting effect to at least a portion of the light beam of the lighting device; and wherein, in a second position of the variable frost system, the first frost component and the fourth frost component are at least partially overlapped with each other and the second and third frost components are at least partially overlapped with each other.

15. The lighting device of claim 14, wherein the first motor and the second motor move simultaneously.

16. The lighting device of claim 14, wherein the first motor causes the first frost component to move in a clockwise direction and the second motor causes the second frost component to move in a counterclockwise motion.

17. The lighting device of claim 14, wherein the combined frost lighting effect includes the lighting effect of the first frost component and a lighting effect of the second frost component, and wherein the lighting effect of the first frost component is substantially similar to a lighting effect of the second frost component.

18. The lighting device of claim 14, wherein, in the second position of the variable frost system, the lighting effect of the first frost component and a lighting effect of the fourth frost component combine to create a different combined frost light effect that is greater than the combined frost lighting effect of the first position of the variable frost system.

19. The lighting device of claim 14, wherein the combined frost lighting effect is less than the lighting effect of the third frost lighting effect.

20. The lighting device of claim 14, wherein the first and third frost components do not overlap in the first or second position.

* * * * *